United States Patent [19]

Broding

[11] 4,020,919
[45] May 3, 1977

[54] SEISMIC SOURCE WITH NO REACTION MASS

[75] Inventor: Robert A. Broding, Tulsa, Okla.
[73] Assignee: Standard Oil Company (Indiana), Chicago, Ill.
[22] Filed: Nov. 14, 1975
[21] Appl. No.: 632,050
[52] U.S. Cl. .............................. 181/119; 181/113; 181/401
[51] Int. Cl.² .......................................... G01V 1/14
[58] Field of Search .......... 181/119, 120, 113, 114, 181/108, 106, 401; 248/206 R

[56] References Cited

UNITED STATES PATENTS

| | | | |
|---|---|---|---|
| 2,910,134 | 10/1959 | Crawford et al. | 181/401 |
| 3,365,019 | 1/1968 | Bays | 181/401 |
| 3,701,968 | 10/1972 | Broding | 181/114 |

*Primary Examiner*—Howard A. Birmiel
*Attorney, Agent, or Firm*—Richard A. Stoltz

[57] ABSTRACT

An apparatus and method for generating seismic signals are described using a modulated vacuum within a chamber plus a compliant, vibration-isolating means. This compliant, vibration-isolating means provides a seal between the chamber and the earth, and also generally prevents the vibration of the chamber from being transferred to the earth. The seismic signal is transmitted directly to the earth by the changes in absolute air pressure within the chamber (the modulated vacuum). As the vibrations of the chamber are generally out of phase with the force developed by the changes in chamber pressure, the chamber vibrations must, for good efficiency, be isolated from the earth. This arrangement is lightweight and inexpensive, as there is no need for either a special mass to induce the vibrations or a special mass to hold the vibrating mass in contact with the earth's surface.

5 Claims, 5 Drawing Figures

EARTH'S SURFACE

SEISMIC SOURCE WITH NO REACTION MASS

BACKGROUND OF THE INVENTION

This invention relates to seismic geophysical surveying and is directed to surveying by the use of cyclically varying seismic waves generated by a vibration generator. Specifically, the invention uses a modulated vacuum to transfer the vibrations to the earth and does not require either a reaction mass to generate the vibrations or a hold-down mass to keep the apparatus in contact with the earth's surface.

The most common method of generating seismic signals is probably by means of an explosive. In recent years, however, several methods of seismic surveying have been developed which utilize a vibrating energy source, such as a mechanical vibrator. A typical, commonly used mechanical vibrator, for example, has a gross weight of about 31,260 pounds (about 22,000 pounds of which is used as hold-down weight), and has a peak force rating of about 15,000 pounds. This unit has a reaction mass of 3,800 pounds, which is hydraulically accelerated alternately up and down to generate the 15,000-pound force (30,000 pounds peak to peak). The acceleration of this relatively large mass requires heavy equipment, and the complete unit is expensive and heavy. The unit is truck-mounted, but it is not as portable as would be desired as there are many areas inaccessible to large trucks. Even though the system used for such vibrators is very large, the seismic waves generated are somewhat limited and often multiple units are used with their outputs synchronized by systems such as described in U.S. Pat. No. 3,698,508, issued to Landrum, on Oct. 17, 1972. The mechanical vibrator exerts a relatively high pressure on the earth's surface. In the aforementioned unit, a maximum of 37,000 pounds of force (15,000-pound peak force plus 22,000 pounds of hold-down weight) is exerted on a pad of about 3,000 square inches, and the resulting 12.3 pounds per square inch frequently leaves an imprint several inches deep in the earth's surface, which imprint is often undesirable. In some cases, of course, the earth's surface is too soft to withstand the 12.3 pounds per square inch pressure, and the mechanical vibrator cannot be used.

Systems have been proposed to reduce the mass somewhat by eliminating either the reaction mass or the hold-down mass. U.S. Pat. 3,701,968, issued to Broding, on Oct. 31, 1972, and U.S. Pat. 3,792,751, issued to Fair, on Feb. 19, 1974, are examples of systems using changes in air pressure (rather than a reaction mass) to generate vibrations. Both systems require a hold-down mass and use the mass of the apparatus as the hold-down mass. U.S. Pat. No. 2,910,134, issued to Crawford, on Oct. 27, 1959, is an example of a system which uses a reaction mass, but which uses a partial vacuum (rather than a mass) to provide the hold-down force. Crawford's system results in rather high concentrations of pressure on the earth's surface as the vibration forces and the hold-down forces are both transferred to the earth through the shell of the structure.

SUMMARY OF THE INVENTION

This invention provides an apparatus and method of generating seismic signals using a partial vacuum which is modulated to apply vibrations directly to the earth's surface. This method and apparatus use a chamber structure which is placed in position with a large opening adjacent to the earth's surface, and with an isolating means positioned around the opening and between the chamber and the earth. A partial vacuum within the chamber is modulated to generate the vibrations and apply them to the earth. Generally, exhausting means and venting means are provided which, together with a flow control means, provide the modulate partial vacuum. This provides for an extremely lightweight apparatus which requires neither a special reaction mass nor the special hold-down mass.

BRIEF DESCRIPTION OF THE DRAWINGS

The invention will be further described by reference to the following drawings in which.

DESCRIPTION OF THE PREFERRED EMBODIMENTS

Figure 1:
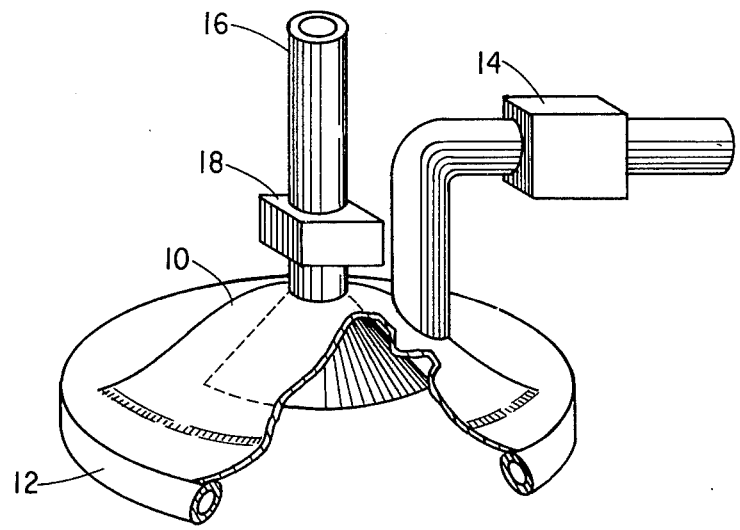
FIG. 1 is a perspective view with the chamber partially cut away and with the air-exhausting means and flow-controlling means shown schematically.

FIG. 1 generally illustrates the apparatus of this invention. The chamber 10 has a large opening adapted to be positioned adjacent to the earth's surface. A vibration-isolating means 12 is positioned around the large opening in contact with the chamber and the earth's surface. The vibration-isolating means is also compliant to generally form a seal between the chamber and the earth, thus functioning both to seal, as well as substantially reduce vibrations induced into the earth from the chamber's structure. An inflated toroid, such as an automobile tire innertube, conveniently provides a compliant, vibration-isolating means.

The air-exhausting means 14 is connected by piping to the chamber and at least periodically removes air from the chamber to provide a partial vacuum in the chamber. The venting means 16 is connected to the chamber to (at least periodically) allow air to enter the chamber. The flow-controlling means 18 is connected to either the air-exhausting means 14 or the venting means 16, or both (it must be connected to at least one of them, and in FIG. 1, the flow-controlling means 18 is connected to the venting means 16), for modulating the partial vacuum in the chamber. The connections are such as to allow passage of air and are typically, but not necessarily, by means of conventional piping. Preferably, the air-exhausting means 14, the venting means 16, and the flow-controlling means 18 are positioned in very close proximity to the chamber 10 to maximize the frequency response and the efficiency of the apparatus.

Figure 2:
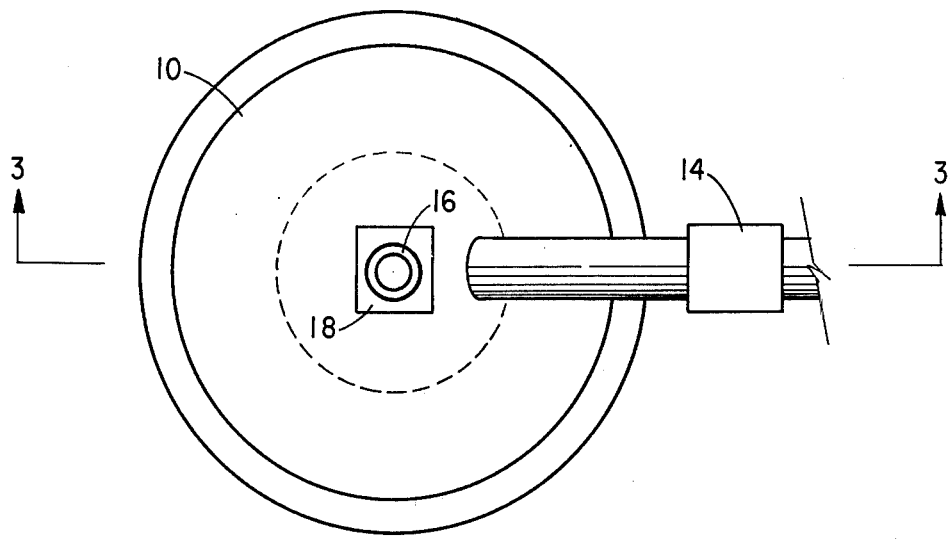
FIG. 2 is a partially schematic, plan view.

FIG. 2 shows a plan view of the apparatus. While a circular configuration is shown in the figures, the chamber structure configuration is not critical and other configurations, such as oval or rectangular, could also be used. A vacuum pump can be used for the air-exhausting means 14, but not many types of exhaust blowers could also be used. A shop-type vacuum sweeper was used successfully in experiments and developed up to about ½ psi of vacuum in the chamber.

Figure 3:
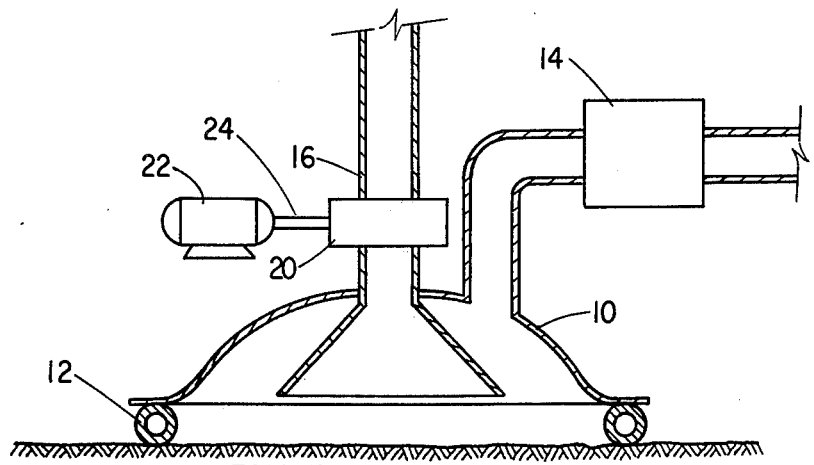
FIG. 3 is a partially schematic, sectional view taken along line 3—3 of FIG. 2, with a motor-driven rotary valve embodiment of the flow-controlling means.

FIG. 3 shows a rotary valve 20 driven by motor 22 through shaft 24 as the flow-controlling means. In FIG. 3 the flow-controlling means is connected to control the flow of air through the venting means 16. The modulated partial vacuum could also be achieved by having a constant vent (in which case, the venting means 16 could be a hole in the chamber) and controlling the flow into the air-exhausting means 14. Other types of flow-controlling means, such as in the aforementioned Broding and Fair patents, could also be used.

Figure 4:
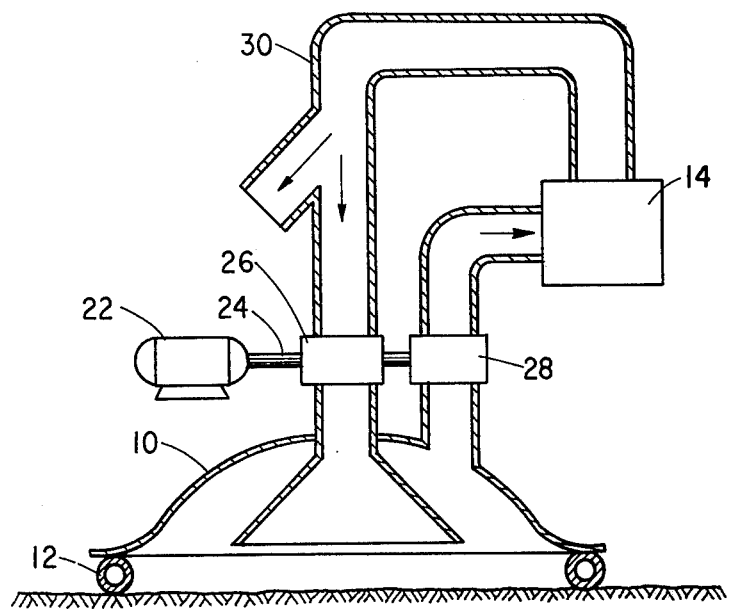
FIG. 4 is a partially schematic, sectional view of an embodiment with two rotary valves providing alternate exhausting and venting of the chamber and with a portion of the outlet air-exhausting means fed to the venting means.

FIG. 4 shows an embodiment wherein the flow-controlling means is connected to both the air-exhausting means and the venting means to alternately provide venting and exhausting of the chamber. Thus, when the rotary valve 26 in the venting line 16 is fully open, the rotary valve 28 leading to the air-exhausting means 14 is fully closed and the chamber is vented and the chamber pressure rises up toward atmospheric pressure. As the motor 22 turns, the vent rotary valve 26 starts to close and the exhaust rotary valve 28 starts to open. The motor 22 continues to turn, and, when the vent rotary valve 26 has fully closed, the exhaust rotary valve 28 has fully opened, and the chamber pressure drops. Generally, the rotary valves can be cycled in this manner at a rate of from one to 100 times per second.

FIG. 4 also shows the air-exhausting means 14 with an air discharge 30 which is connected to supply a portion of the outlet air of the air-exhausting means 14 to the venting means 16. Only a portion of the air is recirculated as there is some leakage around the compliant, vibration-isolating means 12 and a partial vacuum is maintained within the chamber 10. Recirculating a portion of the air provides the advantage of a slightly higher pressure at the vent 16 and thus allows a somewhat higher frequency operation.

If a number of chambers are used, phase control should be used to synchronize them. They could be synchronized, for example, generally in a manner such as discussed in the aforementioned U.S. Pat. No. 3,698,508. It is, of course, possible to use a single air-exhausting means 14 for several chambers.

Figure 5:
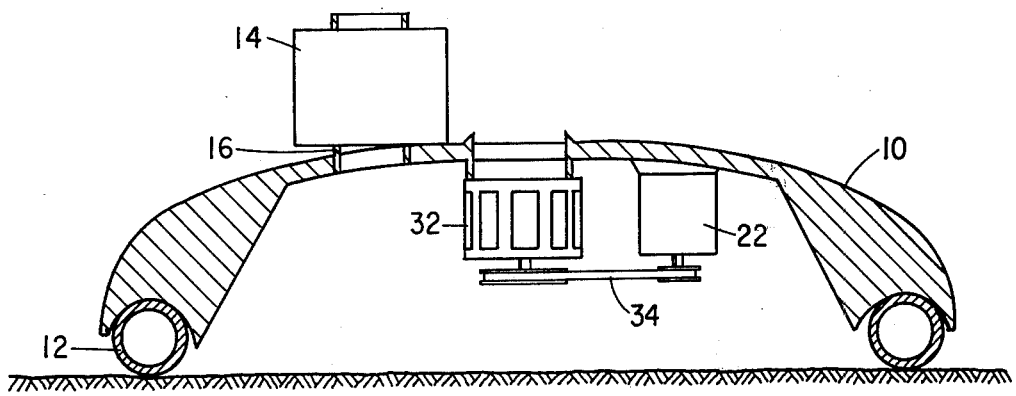
FIG. 5 is a partially sectioned, elevational view of an embodiment using a siren type of configuration for the flow-controlling means.

FIG. 5 shows a somewhat different embodiment where the flow-controlling means has a configuration, generally that of a siren. The motor 22 drives the siren rotor 32 by means of belt 34. When the rectangular holes in the siren rotor 32 line up with the rectangular holes in the siren's stator, air is vented into the chamber 10 and thus the chamber vacuum is modulated.

In one example of the practice of the invention, a 30-inch diameter bicycle tire innertube was used as a compliant, vibration-isolating means. The chamber was formed by a flat plate on top of the innertube. A rotary valve was used and, with the rotary valve closed, the shop-type vacuum cleaner was capable of generating approximately ½ psi pressure reduction in the chamber. This gave a downward force of about 353 pounds from the partial vacuum plus approximately 25 pounds due to the weight of the apparatus. By rotating the air valve at various rates, seismic frequencies in the range of one to 100 hertz were generated. Seismic detectors were placed on the surface of the ground and also in a hole approximately 100 feet deep. The downhole measured seismic energy was relatively high, indicating good coupling of the energy from the apparatus into the earth, and even this relatively unsophisticated apparatus gave efficiencies (signal power/housepower of input) as high as commercial mechanical seismic vibrators, and gave about 14 pounds of peak-to-peak force per pound of apparatus (compared to less than one pound of peak-to-peak force per pound of apparatus for the commercial vibrator).

The experiment was repeated using a similar apparatus but without a vibrating-isolating means (without the bicycle innertube). The efficiency of the apparatus without the innertube was only approximately ⅓ of the efficiency of the apparatus with the innertube. Elimination of the vibration-isolating means allowed chamber vibrations to be transferred to the earth, and these chamber vibrations were essentially 180° out of phase with the signal induced by the modulating vacuum. Thus, when measured 100 feet down in the ground in this case, the vibrations from the chamber tended to cancel the vibrations from the modulating vacuum and the signal measured in the ground was much lower. Thus it can be seen that the vibration-isolation characteristics are critical to system effectiveness.

It will be noted that the phase of the chamber vibrations could be shifted by increasing the height of the chamber, and thus reduce the amount of cancellation in a configuration without a vibration-isolating means. This is impractical, however, as the size and weight of the chamber would be greatly increased, and the increased volume would increase the required size of exhausting means. Further, the dimension would be appropriate only for a narrow range of frequencies. In practice of the invention, the chamber height should be held to a minimum to avoid the aforementioned difficulties.

While innertube configurations are quite satisfactory, other types of compliant, vibration-isolating means could be used. Any other configuration should have a surface adjacent to the earth which is compliant enough to provide at least some sealing to minimize leakage between the chamber and an uneven surface of the earth to allow for the partial vacuum to be effectively drawn within the chamber. The other configuration must provide substantial vibration-isolation (that is, it must absorb, rather than transfer, the major part of the chamber vibration) at frequencies within the operating range. The isolator configuration preferably reduces the transfer of chamber vibration to the earth such that less than ten percent of the energy is transferred. Sponge rubber, for example, could also be used as the material for the compliant, vibration-isolating means.

The amount of partial vacuum and the degree to which it is modulated can both be varied. In the experiments, the partial vacuum was cycled between about ½ psi of vacuum and about atmospheric pressure. Theoretically, on a hard surface, the vacuum could be modulated between a near perfect vacuum and about atmospheric pressure (the pressure can rise slightly above atmospheric for a small portion of the cycle as long as the upward force does not exceed the weight of the apparatus). Leakage, especially if the earth is loose or very uneven, generally dictates lesser amounts of vacuum. Vacuums of between about 0.25 psi and 5 psi can generally be used. The modulation should be at least 0.25 psi and can be but need not be as much as the amount of vacuum and cannot, of course, significantly exceed the amount of vacuum.

It can be seen that this modulated vacuum seismic source with its compliant, vibration-isolating means eliminates both the conventional reaction mass and the hold-down mass of the present mechanical vibrating seismic sources and provides for a lightweight seismic source. The apparatus is relatively inexpensive, as most of the expensive, heavy equipment is eliminated. These small units are highly portable and can be used in areas inaccessible to heavy trucks. The use of multiple small seismic generator units is also convenient for generation of patterns for directing the energy. The relatively small earth loading (less than one psi, for example) reduces the ecology problems associated with the imprint of the present mechanical vibrators.

I claim:

1. A lightweight apparatus for generating seismic signals using a modulated partial vacuum to apply vibrations to the earth's surface, said apparatus comprising:
   a. a chamber structure having a large opening, said large opening being adapted to be positioned adjacent to the earth's surface;
   b. a compliant, vibration-isolating means positioned around said large opening and in contact with said chamber and the earth's surface to generally form a seal between said chamber and the earth's surface, and to substantially reduce vibrations induced into the earth from the chamber structure;
   c. an air-exhausting means connected to said chamber for at least periodically providing a partial vacuum in said chamber;
   d. a venting means connected to said chamber for at least periodically allowing air to enter said chamber; and
   e. a flow-controlling means connected to at least one of said air-exhausting means and said venting means for modulating the partial vacuum in said chamber.

2. The apparatus of claim 1, wherein said flow-controlling means is connected to said venting means.

3. The apparatus of claim 1, wherein said flow-controlling means is connected to both said air-exhausting means and said venting means to alternately provide venting and exhausting of said chamber.

4. The apparatus of claim 3, wherein said exhausting means has an air discharge and said air discharge connected to supply a portion of the discharged air to said venting means.

5. A method of generating seismic signals using a modulated partial vacuum to apply vibrations to the earth's surface, said method comprising:
   a. placing a chamber structure having a large opening in a position with said opening adjacent to the earth's surface;
   b. positioning a compliant, vibration-isolating means around said chamber opening between said chamber and the earth's surface; and
   c. modulating a partial vacuum within said chamber.

* * * * *

UNITED STATES PATENT OFFICE
CERTIFICATE OF CORRECTION

PATENT NO. : 4,020,919

DATED : May 3, 1977

INVENTOR(S) : Robert A. Broding

It is certified that error appears in the above-identified patent and that said Letters Patent are hereby corrected as shown below:

Column 2, line 7, "modulate" should be --modulated--;
 line 67, after "but" delete "not"

Column 4, line 5, after "commercial" insert --mechanical--.

Column 6, line 15 (Claim 4), after "discharge", second occurrence,
 insert --is--.

Signed and Sealed this thirtieth Day of August 1977

[SEAL]

Attest:

RUTH C. MASON
Attesting Officer

C. MARSHALL DANN
Commissioner of Patents and Trademarks